Dec. 22, 1925.
J. L. BURNS
1,566,306
VALVE FOR CONTROLLING HEATED GASES TO INTAKE MANIFOLD JACKETS
Filed Dec. 26, 1919
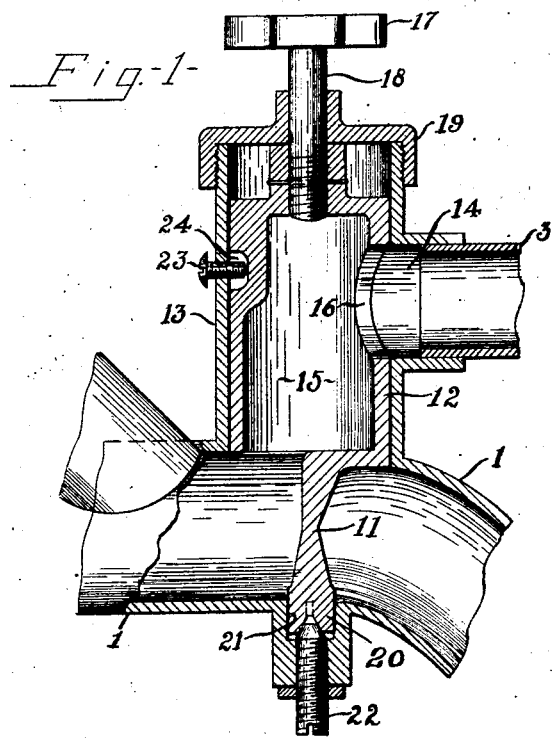
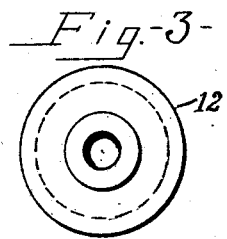
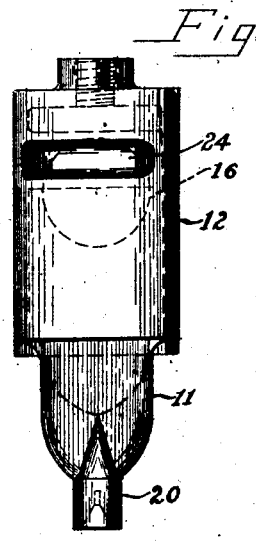
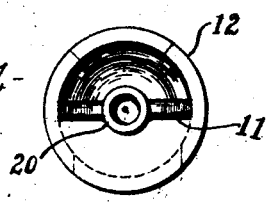
INVENTOR.
John L. Burns
BY
ATTORNEYS.

Patented Dec. 22, 1925.

1,566,306

UNITED STATES PATENT OFFICE.

JOHN L. BURNS, OF SYRACUSE, NEW YORK, ASSIGNOR TO H. H. FRANKLIN MFG. COMPANY, OF SYRACUSE, NEW YORK, A CORPORATION OF NEW YORK.

VALVE FOR CONTROLLING HEATED GASES TO INTAKE-MANIFOLD JACKETS.

Application filed December 26, 1919. Serial No. 347,480.

*To all whom it may concern:*

Be it known that I, JOHN L. BURNS, a citizen of the United States, and a resident of Syracuse, in the county of Onondaga and State of New York, have invented a certain new and useful Valve for Controlling Heated Gases to Intake-Manifold Jackets, of which the following is a specification.

This invention has for its object a particularly simple and efficient means for controlling the flow of exhaust gases from the exhaust pipe to the heating chambers of an intake manifold of an internal combustion engine, to regulate the extent to which the incoming charge of the manifold is preheated, which means is particularly simple in construction, highly efficient and durable in use; and the invention consists in the novel features and in the combinations and constructions hereinafter set forth and claimed.

In describing this invention, reference is had to the accompanying drawings, in which like characters designate corresponding parts in all the views.

Figure 1 is an enlarged sectional view of this controlling means, the contiguous portions of the exhaust pipe of an internal combustion engine and the conduit leading to the heating chamber of the intake manifold, being also shown.

Figure 2 is an elevation of the valve member.

Figures 3 and 4 are opposite end views of the member shown in Figure 2.

1 designates the exhaust manifold or pipe. 3 is the conduit connecting the exhaust pipe and the heating chamber of the intake manifold, the construction being such that the gases from the exhaust pipe flow through the conduit 3 to the heating chamber of the manifold to preheat the gases passing through the manifold to the cylinders of the engine.

The means for controlling the flow of these gases and hence controlling the extent to which the gas passing through the intake manifold is preheated, comprises generally a movable member having a deflector extending into the exhaust pipe 1 and arranged to deflect the gases from the pipe 1 into the connecting conduit 3, the member being adjustable to change the angle of the deflector in order to cause more or less of the gases to pass into the pipe 3.

In the illustrated form of my invention, the deflector is carried by a rotatable member or a member movable about an axis extending at a right angle to the axis of the pipe 1, so that when the member is rotated the deflector may be positioned to stand at a right angle to the axis of the pipe 1 and offer maximum obstruction to the gases, or may be turned at different angles to offer less obstruction.

11 designates the deflector, which as here shown, projects from a rotatable valve member 12 mounted in a suitable casing 13 secured to, or formed integral with, the exhaust pipe 1, this casing having a laterally extending port or nipple 14 to which the pipe 3 is connected and said valve member is formed with a passage 15 which opens through the lower end of the valve member into the pipe 1 in front of the deflector 11 and also opens through the periphery of the valve member at 16 in position to register with the port 14. The upper end of the valve member is closed and said valve member is rotatable by means of a handle or wheel 17 mounted on the shaft or stud 18 extending through a cap 19 of the casing 13 and connected to the head of the valve member 12. Upon rotation of the valve member, the angle of the deflector 11 is changed and also the port 14 is more or less closed by reason of the valve member 12 partly covering the port 14.

As here shown, the deflector is formed with a stud 20 at its end which is located in a suitable seat or bearing 21, formed in the pipe 1, the stud having a conical socket in its end in which the conical end of the screw 22 seats, this screw being adjustable to take up any looseness in the valve. The amount of turning movement of the valve member 12 is limited by means of a shoulder, such as the screw 23, extending through the casing 13 and into a groove 24 formed in the periphery of the valve member 12. When the valve member is turned to the position shown in Figure 1, that is, when it extends diametrically crosswise of the pipe 1, a maximum amount of gases is deflected through the pipe 3 and the port 16 is in full register with the port 14. When less preheating of the intake manifold is desirable, the valve member 12 may be rotated to partly close the port 14 and also position the deflector so that it stands at an inclined angle to the passage of the pipe 1 and permits a greater amount of gases to pass by the deflector than when it stands diametrically of the pipe 1.

What I claim is:

1. In a device of the class described, a casing formed with an outlet port, and an inlet for connection to a feed conduit, and means for controlling the flow of gas through the casing and the port comprising a rotatable member having a deflector arranged to extend into the feed conduit, and means for rotating said member to open and close the port and to change the angle of the deflector, substantially as and for the purpose specified.

2. In a device of the class described, a casing formed with an outlet port, and an inlet for connection with a feed pipe communicating with the casing, a valve member in the casing movable to open and close the port more or less, the valve member having a deflector arranged to extend into the feed pipe, the valve member as it opens and closes said port operating to change the angle of the deflector whereby the deflector is at a greater angle when the valve is fully opened than when the valve is partly opened, substantially as and for the purpose described.

3. In a device of the class described, a cylindrical casing open at one end for connection with a feed conduit and being also formed with an outlet opening through its periphery, a rotatable valve member in the casing opening at one end into the pipe and having a port for registering with the outlet, and also a deflector at the open end of the valve member arranged to extend into the feed pipe for the casing whereby the angle of the deflector is changed as the valve member is moved about its axis, substantially as and for the purpose specified.

4. In a device of the class described, a casing formed with an outlet port, a rotatable member in the casing having a passage opening through its periphery for registering with said outlet port, and also opening through the inner end of said member and having a deflector extending beyond the inner end of the casing, substantially as and for the purpose described.

In testimony whereof, I have hereunto signed my name, at Syracuse, in the county of Onondaga, and State of New York, this 11th day of December, 1919.

JOHN L. BURNS.